(12) United States Patent
Porrati et al.

(10) Patent No.: US 8,676,170 B2
(45) Date of Patent: Mar. 18, 2014

(54) SYSTEM FOR MONITORING THE PHYSICAL ACTIVITY OF A USER, A PORTABLE MEDIUM AND A METHOD FOR MONITORING

(75) Inventors: Luca Porrati, Genoa (IT); Giovanni Strocchi, Milan (IT); Fabrizio Catania, Forli Cesena (IT)

(73) Assignee: Technogym S.p.A., Gambettola (IT)

( * ) Notice: Subject to any disclaimer, the term of this patent is extended or adjusted under 35 U.S.C. 154(b) by 90 days.

(21) Appl. No.: 13/107,319

(22) Filed: May 13, 2011
(Under 37 CFR 1.47)

(65) Prior Publication Data

US 2012/0094649 A1 Apr. 19, 2012

(30) Foreign Application Priority Data

May 17, 2010 (IT) .............................. BO2010A0310

(51) Int. Cl.
*H04M 3/42* (2006.01)
(52) U.S. Cl.
USPC .................. 455/414.1; 455/556.1; 455/556.2; 455/566
(58) Field of Classification Search
None
See application file for complete search history.

(56) References Cited

U.S. PATENT DOCUMENTS

| | | | |
|---|---|---|---|
| 6,746,371 B1 | 6/2004 | Brown et al. | |
| 6,863,641 B1 | 3/2005 | Brown et al. | |
| 6,866,613 B1 | 3/2005 | Brown et al. | |
| 7,373,820 B1 | 5/2008 | James | |
| 7,883,445 B2 | 2/2011 | Olrik et al. | |
| 2004/0077462 A1 | 4/2004 | Brown et al. | |
| 2004/0249315 A1 | 12/2004 | Damen | |
| 2005/0075214 A1 | 4/2005 | Brown et al. | |
| 2007/0219059 A1 | 9/2007 | Schwartz et al. | |
| 2007/0260482 A1 * | 11/2007 | Nurmela et al. | .................. 705/2 |
| 2008/0085778 A1 | 4/2008 | Dugan | |
| 2009/0105047 A1 | 4/2009 | Guidi et al. | |
| 2009/0170480 A1 * | 7/2009 | Lee | .............................. 455/414.1 |
| 2009/0270743 A1 | 10/2009 | Dugan et al. | |

FOREIGN PATENT DOCUMENTS

| | | |
|---|---|---|
| EP | 2050394 A2 | 4/2009 |
| GB | 2454705 A | 5/2009 |
| WO | 2009152608 A1 | 12/2009 |

* cited by examiner

*Primary Examiner* — Suhail Khan
(74) *Attorney, Agent, or Firm* — Pearne & Gordon LLP (57) ABSTRACT

A system for monitoring the physical activity of a user comprises a portable medium and a remote server having access to a database containing data received from the portable medium. The portable medium has a sensor for detecting the movement of the user, a display, a memory, an interface for exchanging data with a gym machine, a processor for deriving in real time a dimensionless parameter representing the physical activity of the user wearing the portable medium, and wireless communication means configured to establish a connection between the portable medium and a mobile telephone which is set up to connect to the remote server to transfer data to the remote server in real time. The remote server is programmed to transmit, in real time, motivational indications as a function of the data transmitted by the portable medium for display on the mobile telephone.

6 Claims, 3 Drawing Sheets

SYSTEM FOR MONITORING THE PHYSICAL ACTIVITY OF A USER, A PORTABLE MEDIUM AND A METHOD FOR MONITORING

TECHNICAL FIELD

This invention relates to a system for monitoring the physical activity of a user, a portable medium and a method for monitoring.

BACKGROUND ART

Well known and widespread in the fitness sector are several systems for monitoring the physical activity of a user during a workout, or more generally, during an entire day.

These monitoring systems provide the user with quantitative information regarding the amount of physical activity he or she has performed. The systems are not therefore particularly useful or effective for assessing the level of achievement of preset physical activity targets based on training and/or body weight loss programs.

These systems usually comprise a portable device which can be placed in a pocket or attached to a garment and which is designed to capture a signal proportional to the physical activity performed in any place and/or at any time of day.

European patent application EP 2 050 394 in the name of the same Applicant as this invention describes a system for analyzing and monitoring physical activity done by a user and which comprises a portable device equipped with: a one-dimensional accelerometer; an electric battery; a memory configured to save samples of the signal detected by the accelerometer; a display unit for displaying a parameter representing the physical activity done; an RFID data communication module with a USB connector; and a processor for deriving from the data present in the memory the parameter representing the physical activity.

The display unit of the portable device is set up to display a dimensionless (i.e. adimensional) parameter (a variable length bar, a pure number, etc.) which provides a quantitative indication of the amount of physical activity actually performed by the user.

The dimensionless parameter is calculated by the processor using a predetermined algorithm and represents the daily physical activity done by the user.

The portable device can be connected through an RFID module to a processor of a gym machine; before starting an exercise, the user connects the device to the processor of the machine to transfer a specific training program from the portable device to the processor and when the exercise has been completed, the portable device is again connected to transfer data from the gym machine processor to the memory of the portable device.

The portable device can also be connected, using the USB connector, to a PC which may in turn be connected to a remote server. The user, when not monitoring his or her own physical activity, may therefore upload the data from the memory of the portable device to the PC and from the latter to a remote server in order to display statistics and/or comparisons useful for assessing the history of his or her own physical activity.

U.S. Pat. No. 7,373,820 describes another example of a physical activity monitoring system comprising a portable device equipped with a multi-axial accelerometer and a memory for saving the data measured by the accelerometer.

The portable device can be connected through a wireless communication module or through an interface cable to a processing device (a PC, a mobile telephone) in communication with a remote server. According to this aspect, the user transfers the data measured by the accelerometer to the processing device and from there to the remote server.

The data on the server are accessible to personnel specialized in the field of physical education and are analyzed to provide the user with a feedback message regarding the physical activity done when the user connects up to the remote server.

This system cannot, however, sufficiently motivate the user because the specialist personnel analyses the data substantially at predetermined intervals.

Also, the portable device is rather complicated since the feedback messages require the user to have a unit that is capable of displaying them or, alternatively, a voice synthesis circuit.

U.S. Pat. No. 7,883,445 describes an apparatus for providing a user with a personal exercise program. In this apparatus, a processor in a server generates a training program and transmits it to a mobile telephone in such a way that the information displayed on the mobile telephone can constitute a guide for performing a fitness exercise. According to this document, a physical activity monitoring device worn by the user derives a physiological parameter of the user to enable the processor to generate a personal training program for the user taking into account the user's actual physical capabilities.

The apparatus described in U.S. Pat. No. 7,883,445 is not a monitoring apparatus, however. In effect, it does not monitor the user's physical activity as a whole (irrespective of whether or not the user performs a predetermined fitness exercise) and does not give the user an overall indication of the physical activity accumulated over time in order to inform and motivate him or her on the basis of targets the user himself or herself has set according to his or her own physical fitness level.

Patent document US 2004/0249315 describes another portable monitoring device comprising a one-dimensional accelerometer, a memory for storing the data measured by the accelerometer, a microprocessor designed to process the accelerometer signal in order to derive a dimensionless parameter representing the movement of the user, and a unit for displaying the value of the parameter.

When the user is not monitoring his or her own physical activity, the portable device can be connected to a PC to transfer to a remote server the data relating to the predetermined dimensionless parameter previously derived.

The user can access the server through a web portal in order to display his or her own personal history, even compared to that of other users, and to calculate new physical activity target values resident in the server.

Patent document GB 2454705 describes a system for monitoring physical activity and comprising a portable device equipped with accelerometers.

The portable device is configured to derive from the signals measured by the accelerometers a parameter relating to the intensity of the exercise the user is performing.

This device, too, is connectable to a PC or other portable processing device and is set up to transfer data from its internal memory to a remote server when the user is not monitoring his or her own physical activity and has connected the portable device to the PC.

The user can access the remote server to display the data, or the progress of the measured parameters over time, as well as suggestions and motivational recommendations for the next training session.

Patent document WO2009/152608 describes a system for monitoring caloric consumption.

This monitoring system, too, comprises a portable device equipped with an accelerometer and a bar display unit for displaying a parameter correlated with caloric consumption.

The portable device is also connectable to fitness machines through a wireless communication interface in order to receive data from the fitness machines.

The device comprises a loudspeaker and a display for providing the user with motivational prompts or information in the event the parameter correlated with caloric consumption is less than a preset target value resident in the memory of the portable device. These motivational prompts are not, however, very effective or really personalized since they are based on a simple threshold type comparison criterion. Moreover, the display unit is relatively sophisticated and, hence, the portable device relatively expensive.

Most users require personalized guidance and motivational prompts to increase the amount of physical activity they do and thus to improve their health and fitness conditions.

A need which has long been felt by users of monitoring systems and which has not been met by the portable devices and monitoring systems described above is that of being able, while actually performing a physical activity, to rely on guidance and particularly effective motivational prompts capable of encouraging them to boost their physical activity.

In light of this, the monitoring systems described above are not able to provide particularly effective prompts for users.

SUMMARY OF THE INVENTION

This invention has for an aim to provide a portable medium, a monitoring system and a method for monitoring the amount of physical activity performed by a user and which can facilitate the transfer of data between a computer and a remote server.

Another aim of the invention is to provide a portable medium, a monitoring system and a method for monitoring the amount of physical activity performed by a user and which allow the user to receive particularly effective motivational information messages in real time.

The above aims are achieved by the system for monitoring the physical activity of a user as characterized in the appended claims.

More specifically, the system for monitoring the physical activity of a user comprises:
  a portable medium which can be worn by the user and which is equipped with: a sensor designed to detect a signal relating to the movement of the user; a power supply; a display unit (e.g. a display screen); a data storage memory; an interface able to be coupled to a gym machine and configured to allow data to be exchanged between the memory and the gym machine; a processor programmed for deriving in real time, at least from the signal detected by the sensor, a dimensionless parameter value representing the physical activity of the user wearing the portable medium and for displaying an indication, as a function of the derived value of the dimensionless parameter, and a reference value of the dimensionless parameter constituting a preset target for the amount of physical activity to be performed by the user in a predetermined time interval;
  a remote server having access to a database containing data received from the portable medium, the portable medium comprising wireless communication means configured to establish a connection between the portable medium and a mobile telephone equipped with a display unit and set up to establish an Internet connection and connect up to the remote server through the Internet connection, the remote server being programmed to transmit, in real time through the Internet connection, motivational indications as a function of the data transmitted by the portable medium to the remote server for displaying the motivational indications on the display unit of the mobile telephone.

The monitoring system according to the invention makes it possible for the user to obtain motivational indications which are particularly effective in prompting the user to increase the amount of physical activity performed.

In effect, advantageously, the server provides the user with motivational indications in real time from the data received. These motivational indications are thus particularly effective because they relate to the physical activity the user is performing at the time of receiving them.

Further, the motivational indications are displayed on a mobile telephone which most users already possess. There is therefore no need to provide the portable medium with a complex display unit to allow the motivational indications to be viewed.

The above mentioned aims are also achieved by a portable medium wearable by a user and as characterized in the appended claims.

More specifically, the portable medium comprises: a sensor set up to detect a signal relating to the movement of the user; a power supply; a display unit; a data storage memory; an interface able to be coupled to a gym machine and configured to allow data to be exchanged between the memory and the gym machine; a processor programmed for deriving in real time. at least from the signal detected by the sensor, a dimensionless parameter value representing the physical activity of the user wearing the portable medium and for displaying on the display unit an indication, as a function of the derived value of the dimensionless parameter, and a reference value of the dimensionless parameter constituting a preset target for the amount of physical activity to be performed by the user in a predetermined time interval; wireless communication means configured to establish a connection between the portable medium and a mobile telephone set up to establish an Internet connection to a remote server to transfer the data relating to the movement of the user to the remote server through the Internet connection in real time.

The portable medium is advantageously configured to establish a connection with a mobile telephone which most users nowadays possess. This allows data to be transferred from the portable medium, to the remote server in real time.

Furthermore, the portable medium can also transfer to the remote server in real time data received through the interface from the gym machine. This information, too, can thus be transferred to the remote server so that the remote server can derive relatively complicated statistics.

The above aims are also achieved by a method for monitoring the physical activity of a user as characterized in the appended claims.

More specifically, the method for monitoring the physical activity of a user comprises the steps of: preparing a portable medium designed to be worn by the user and to detect a signal relating to the movement of the user; preparing a mobile telephone configured to establish a connection to the Internet; deriving from the movement signal detected by the portable medium a value of a dimensionless parameter representing the physical activity of the user wearing the portable medium; setting a reference value of the dimensionless parameter constituting a preset target for the amount of physical activity to be performed by the user in a predetermined time interval; displaying, in real time on the portable medium, an indication as a function of the derived value of the dimensionless parameter and of the reference value of the dimensionless parameter; transmitting data relating to the movement of the user in real time to the mobile telephone which is in communication through the Internet with a remote server in order to transfer the data to the remote server; deriving in real time in the remote server a motivational indication as a function of the data received from the portable medium; transmitting the motivational indication in real time to the mobile telephone through the Internet connection established between the mobile telephone and the remote server and displaying the motivational indication on a display unit of the mobile telephone.

The monitoring method according to the invention makes it possible for the user to obtain motivational indications which are particularly effective in prompting the user to increase the amount of physical activity performed.

In effect, advantageously, the method proposed provides the user with motivational indications derived in real time from the data received.

The motivational indications are displayed on the mobile telephone and are thus particularly effective in that they relate to the physical activity the user is performing at the time of receiving them.

The above aims are also achieved by a system for monitoring the physical activity of a user as characterized in the appended claims.

More specifically, the system for monitoring the physical activity of a user comprises: a portable medium which can be worn by the user and which is equipped with: a sensor designed to detect a signal relating to the movement of the user; a power supply; a display unit; a data storage memory; an interface able to be coupled to a gym machine and configured to allow data to be exchanged between the memory and the gym machine; a processor programmed for deriving in real time. at least from the signal detected by the sensor, a dimensionless parameter value representing the physical activity of the user wearing the portable medium and for displaying an indication, as a function of the derived value of the dimensionless parameter and of a reference value of the dimensionless parameter constituting a preset target for the amount of physical activity to be performed by the user in a predetermined time interval; a remote server having access to a database containing data received from the portable medium, the portable medium comprising: a connector for plugging (coupling) the portable medium in to a computer and allowing data to be exchanged between the portable medium and the computer; wireless communication means having a modem set up to cooperate with the connector for establishing a connection to a public land mobile network when the portable medium is plugged in (that is, coupled to) the computer, to allow data to be transferred between the portable medium and/or the computer and the remote server.

The system can facilitate the transfer of data from the portable medium to the remote server. In effect, when the portable medium is connected to a PC, the wireless modem establishes a connection to the Internet which is used for two-way data transfer between the PC and the remote server.

Furthermore, the portable medium makes it possible to connect a computer to the Internet also for purposes other than data transfer from the portable medium to the remote server. For example, it allows a computer to be connected to the Internet for recreational purposes or to search for information.

The above mentioned aims are also achieved by a portable medium wearable by the user and as characterized in the appended claims.

More specifically, the portable medium wearable by a user comprises: a sensor designed to detect a signal relating to the movement of the user; a power supply; a display unit; a data storage memory; an interface able to be coupled to a gym machine and configured to allow data to be exchanged between the memory and the gym machine; a processor programmed for deriving in real time. at least from the signal detected by the sensor, a dimensionless parameter value representing the physical activity of the user wearing the portable medium and for displaying an indication, as a function of the derived value of the dimensionless parameter and of a reference value of the dimensionless parameter constituting a preset target for the amount of physical activity to be performed by the user in a predetermined time interval; a connector for plugging the portable medium in to a computer and allowing data to be exchanged between the portable medium and the computer; wireless communication means having a modem set up to cooperate with the connector for establishing a connection to a public land mobile network when the portable medium is plugged in to the computer, to allow data to be transferred between the portable medium and/or the computer and a remote server.

The above aims are also achieved by a monitoring method as characterized in the appended claims.

More specifically, the method for monitoring the physical activity of a user comprises the steps of: preparing a portable medium designed to be worn by the user while performing the physical activity; deriving from the movement signal detected by the portable medium a value of a dimensionless parameter representing the physical activity of the user wearing the portable medium; setting a reference value of the dimensionless parameter constituting a preset target for the amount of physical activity to be performed by the user in a predetermined time interval; displaying, in real time on the portable medium, an indication as a function of the derived value of the dimensionless parameter and of the reference value of the dimensionless parameter; plugging the portable medium in to a computer to allow data to be transferred from the portable medium to the computer and vice versa; after the plugging in step, establishing a connection to a public land mobile network through a wireless modem provided in the portable medium; transferring detected and/or derived data, relating to the movement performed by the user, from the portable medium and/or from the computer to a remote server through the Internet connection.

BRIEF DESCRIPTION OF THE DRAWINGS

These and other characteristics of the invention will become more apparent from the following detailed description of a preferred, non-limiting example embodiment of it, with reference to the accompanying drawings, in which.

DESCRIPTION OF THE PREFERRED EMBODIMENTS OF THE INVENTION

With reference to FIGS. 1-4, the reference numeral 3 denotes a portable medium which can be worn by the user 2.

Hereinafter, the portable medium 3 will also be referred to simply as medium 3.

Figure 1:
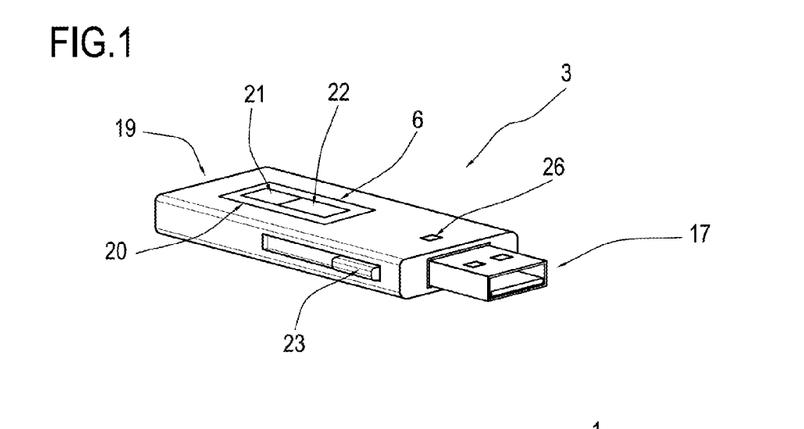
FIG. 1 is a schematic perspective view of a preferred embodiment of the portable medium according to this invention.

The portable medium 3, better illustrated in FIG. 1, is defined by a containing element 19.

The containing element 19 is substantially in the shape of a parallelepiped and is designed to be worn by the user 2, that is to say, fixed to a garment or carried inside a pocket of a garment.

Figure 2:
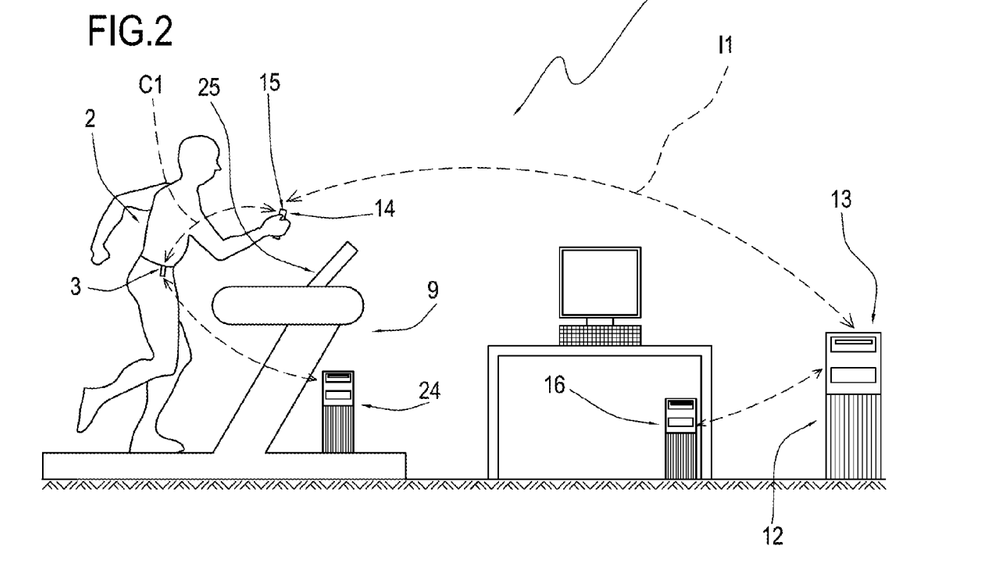
FIG. 2 is a schematic side view of the monitoring system according to this invention where a user performs physical activity on a gym machine.

In FIG. 2 the portable medium 3 is fixed to the trousers of a user 2.

Preferably, the portable medium 3 is waterproof so that the user 2 can wear the medium 3 to practice a sport in bad weather conditions, such as rain or other atmospheric precipitations.

According to the invention, the portable medium 3 comprises a three-dimensional accelerometer 4 set up to detect an acceleration signal relating to the movement of the user 2 in three axes at right angles to each other.

Advantageously, the three-dimensional accelerometer 4 makes it possible to detect a signal which reliably represents the movement of the user 2 independently of where the medium 3 is positioned relative to the body of the user 2, that is to say, the portable medium 3 does not need to be worn in a predetermined position on the body of the user 2, as is instead the case with many prior art portable mediums.

The three-dimensional accelerometer 4 constitutes a sensor 4 of the portable medium 3 designed to detect a signal relating to the movement of the user 2.

The portable medium 3 further comprises, according to the invention, a data storage memory 7.

The memory 7 is set up to save data measured by the sensor 4 as well as processes performed on the data measured and/or identification information of the user.

Figure 3:
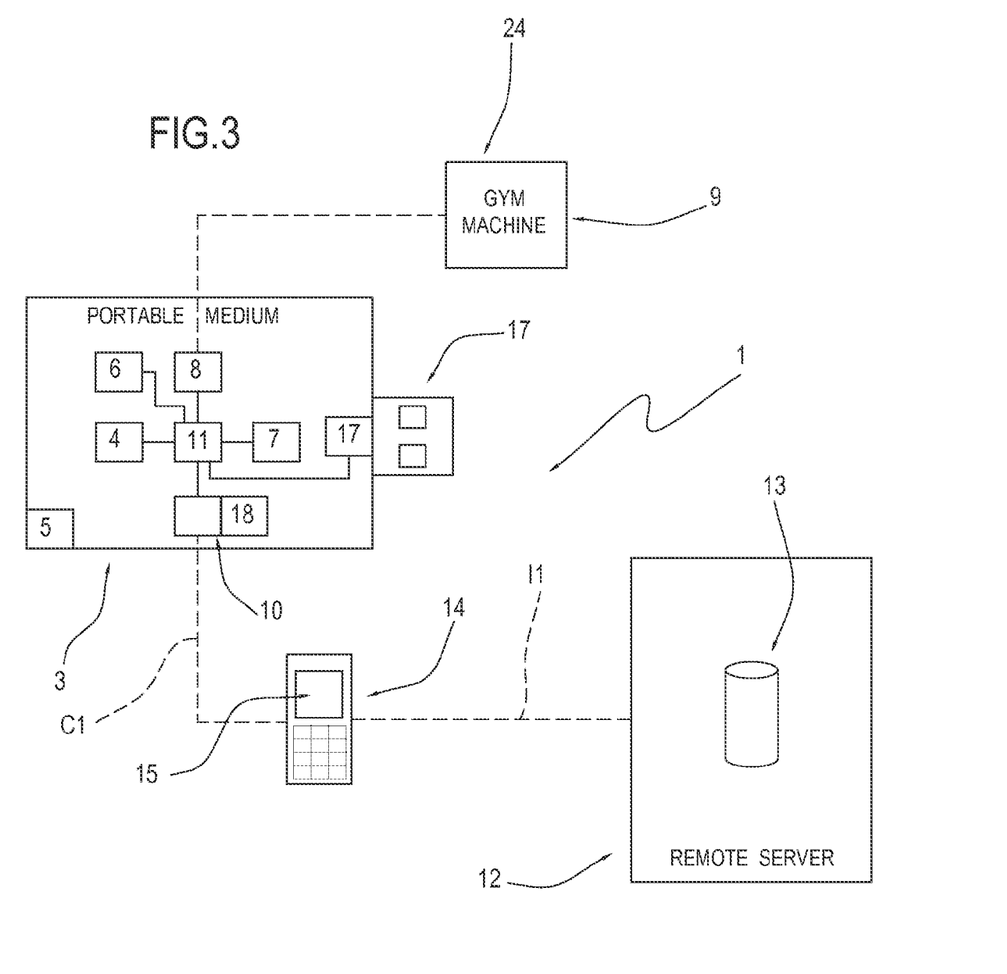
FIG. 3 shows a view of a preferred embodiment of the monitoring system according to this invention schematically representing the interaction between the different parts of the system.

The portable medium 3 further comprises an interface 8 which can be coupled to a gym machine 9 and which is configured to allow data to be exchanged between the memory 7 and the gym machine 9.

More specifically, the interface 8 is configured be coupled to a processor 24 of the selfsame gym machine 9 or directly to the sensors of the gym machine 9.

Preferably, the interface 8 is an ANT+ interface.

In effect, as is known, the sensors commonly used in gym machines 9 exchange data through ANT+ interfaces. Advantageously, therefore, having an ANT+ interface means that the portable medium 3 can receive data from the sensors of gym machines 9 already on the market without having to make any hardware modifications to the gym machines 9 to enable them to exchange data with the portable medium 3.

It should be noted that (in addition or alternatively to the ANT+ interface) the interface 8 is defined by a wired connection (for example with USB or micro-USB technology), or wireless connection embodied in an RFID element (associated with the medium 3) able to be plugged in to a reader mounted on the gym machine and operatively located in the proximity of the RFID element (the RFID element and the related reader communicating through a MIFARE or NFC protocol).

According to the invention, the portable medium 3 comprises a processor 11.

The processor 11 is programmed for deriving in real time from the signal detected by the sensor 4 a dimensionless parameter representing the physical activity of the user 2 wearing the portable medium 3.

The dimensionless parameter is a numeric value directly proportional to the amount of physical activity performed by the user 2.

The portable medium 3 further comprises a display unit 6.

By way of a non-limiting example, the display unit 6 comprises an LCD display or, more preferably, a LED display, such as a seven-segment display or still more simply, a plurality of LEDs and able to be selectively activated.

Preferably, the display unit 6 is configured to minimize its energy consumption, that is to say, the display unit 6 is preferably equipped with a device designed to reduce the energy consumption of the display unit 6.

With reference to FIG. 1, the display unit 6 is an LCD display.

The processor 11 is programmed to display on the display unit 6 an indication as a function of the derived value of the dimensionless parameter and of a reference value of the dimensionless parameter constituting a preset target for the amount of physical activity to be performed by the user 2 in a predetermined time interval.

The reference value of the parameter defines, preferably but not exclusively, a target for the daily amount of physical activity which the user 2 must perform, that is to say, it is a target for the physical activity to be performed in the span of one day.

Again by way of an example and with reference to FIG. 1, shown on the display unit 6 is a rectangle 20 of predetermined extension and comprising a first portion 21, identified by a first color (dark) and a second portion 22, identified by a second color (light).

The surface of the first portion 21 may have an extension that is between a minimum value, where the selfsame first portion 21 has zero extension, and a maximum value, where the extension of the first portion 21 corresponds to that of the whole rectangle 20, that is to say, where the rectangle 20 has no second portion 22.

The extension of the first portion 21 relative to the extension of the rectangle 20 represents an indication of the value of the dimensionless parameter relative to the reference value.

Alternatively, the indication may be provided by the user 2 in the form of a numeric value displayed on the display unit 6.

Figure 4:
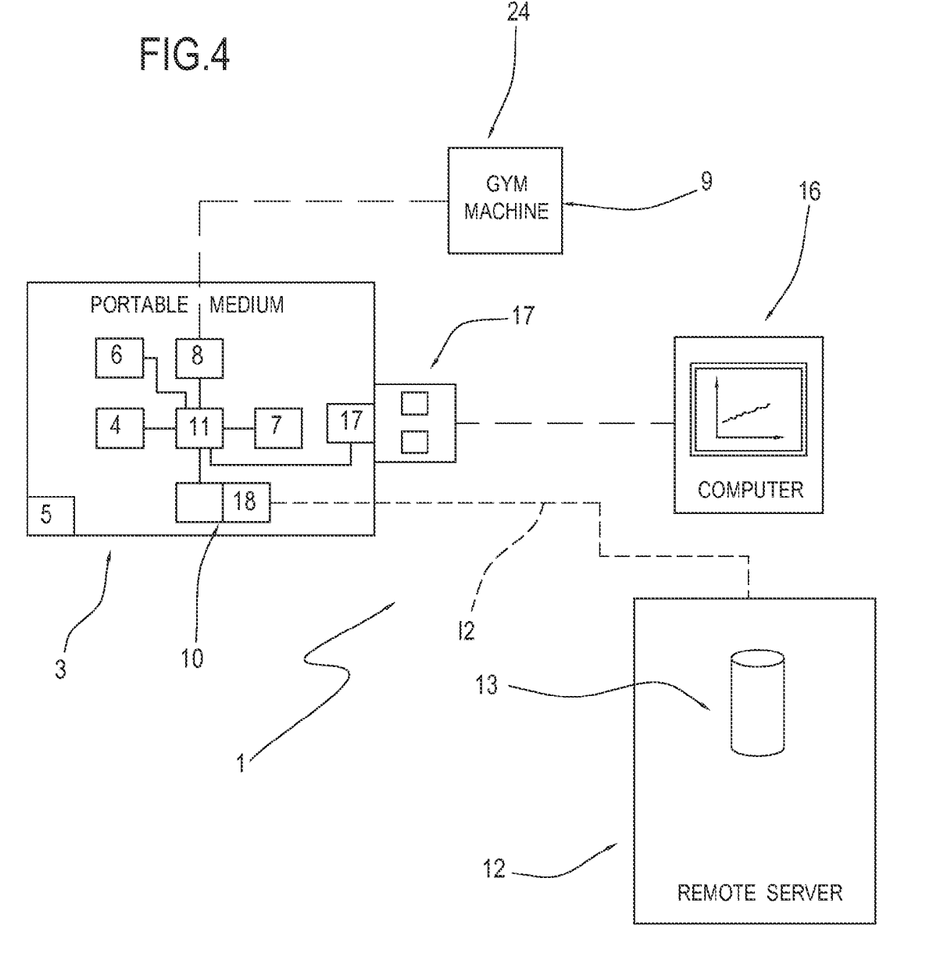
FIG. 4 shows a view of another embodiment of the monitoring system according to this invention schematically representing the interaction between the different parts of the system.

The portable medium 3 further comprises a connector 17 by which it can be plugged in to a computer 16 and allowing data to be exchanged between the portable medium 3 and the computer 16.

The computer 16 will hereinafter also be referred to as PC 16.

Preferably, the connector 17 is a USB connector.

The USB connector 17 is preferably movable relative to the containing element 19 between a retracted position, not illustrated in the drawings, where the connector 17 is withdrawn into the containing element 19 of the portable medium 3, and an extended position, illustrated in FIG. 1, where it is outside the containing element 19 so it can be plugged in to the computer 16.

The connector 17 can be switched between the extended position and the retracted position using a lever 23.

Also according to the invention, the portable medium 3 comprises a power supply 5 providing electric power 5 for the electronic components of the portable medium 3, that is to say, for the sensor 4, the processor 11, the memory 7, the display unit 6, the 'interface 8 and the other electronic components or devices described below.

Preferably the power supply 5 consists of a rechargeable battery.

Still more preferably, the battery 5 is rechargeable through the connector 17 when the connector 17 is plugged in to a computer 16.

The portable medium 3 according to the invention further comprises wireless communication means 10.

Preferably, the portable medium 3 comprises a pushbutton 26, or alternatively, a switch, to turn the wireless communication means 10 on or off. This allows energy saving because the user 2 can turn on the wireless communication means 10 only when required.

The pushbutton or switch constitutes means 26 for turning the wireless communication means 10 on or off.

The monitoring system according to the invention, denoted by the reference numeral 1 in FIGS. 2 and 3, comprises a remote server 12 in addition to the portable medium 3.

The remote server 12 has access to a database 13 configured to contain data received from the portable medium 3.

The database 13 may also contain other information, including biometric information about the user 2, such as, for example, age, weight, sex and details about the lifestyle of the user 2.

According to one aspect of the invention, the remote server 12 is configured to allow selection of a criterion for calculating the reference value of the dimensionless parameter.

The remote server 12 is also set up to download into the memory 7 of the portable medium 3 instructions for calculating the reference value of the dimensionless parameter, said instructions relating to the selected calculation criterion.

Once downloaded into the memory 7, these instructions are used by the processor 11 to calculate the reference value of the dimensionless parameter.

In other words, the user 2 can select in the remote server 12 a personal criterion for calculating the reference value of the dimensionless parameter, that is to say, a target for the amount of daily physical activity he or she should perform, in order to derive instructions downloadable into the portable medium 6 in such a way that the processor 11 can use them to calculate the reference values of the dimensionless parameter.

Preferably, according to this aspect of the invention, the user 2 can connect up to the remote server 12 from a computer 16 (such as, for example, a laptop computer or a plain PC), through an Internet connection, to retrieve from the database 13 a record relating to the user 2.

By way of a non-limiting example, the user 2 accesses a website on the remote server 12 and logs in to be able to retrieve his or her personal record.

The user 2 thus gains access to his or own personal historical data stored in the database 13 of the remote server 12 and measured previously by the portable medium 3.

From the historical data present in the database 13, the user 2 can obtain a plurality of statistics or other processed information, such as for example, a graph of the daily value of the reference parameter. The user can thus assess the progress of his or her own performance over time.

Preferably, the remote server 12 is configured to allow the user 2 to enter personal information about himself or herself into the remote server 12.

By way of a non-limiting example, the website on the remote server 12 comprises a web page accessible to the user 2 and where the user 2 can enter biometric information and/or data relating to his or her lifestyle and/or the level of fitness he or she wishes to achieve.

According to this aspect, the remote server 12 is configured to generate instructions for calculating the reference value of the dimensionless parameter as a function of the historical data contained in the database 13 and also of the personal information entered by the user 2 in the remote server 12.

Advantageously, this can provide the user 2 with instructions which, once downloaded into the memory 7, are used by the processor 11 to derive reference values of the dimensionless parameter as a function of requirements expressed by the user 2 through the personal information entered in the remote server 12.

In a variant embodiment of the monitoring system 1, the remote server 12 is configured to display to the user 2 a list of criteria for calculating the reference value of the dimensionless parameter.

Preferably, in this variant embodiment, the remote server 12 is configured to propose to the user 2 a default criterion obtained as a function of the results achieved by the user 2. The user 2 can accept the criterion proposed by the remote server 12 or select another one.

According to yet another aspect, the interface 8 is configured to receive in real time from the gym machine 9 at least one signal representing the physical activity performed by the user on the gym machine 9.

The processor 11 is programmed for deriving the dimensionless parameter also from the signal received from the gym machine 9 and to display the indication in real time on the display unit 6 and/or on the display unit 25 of the gym machine 9.

Described below are features relating to a first and a second aspect of the invention. The features relating to the first and second aspects of the invention may be present in combination with, or alternatively to, each other and, in light of this, must not be considered as mutually exclusive.

According to the first aspect of the invention, illustrated in FIG. 3, the wireless communication means 10 are configured to establish a short-range connection C1 between the portable medium 3 and a mobile telephone 14.

The term "short-range connection" means a connection established through a wireless technology, such as Bluetooth or ANT+, which allows data to be exchanged between two devices at a short distance from one another. This term does not, therefore, denote an Internet connection which, by its very nature, is a long-range connection.

The mobile telephone 14 is preferably a GSM telephone or, alternatively, a satellite telephone.

Preferably, the telephone 14 comprises a SIM card which contains information identifying the telephone 14.

In other words, the SIM card allows the public land mobile network—PLMN—to identify the telephone 14 when the telephone 14 connects up to the PLMN.

Preferably, the wireless communication means 10 comprise a Bluetooth interface.

Advantageously, the Bluetooth interface allows the medium 3 to connect up easily to most of the mobile telephones 14 available on the market, that is to say, those which already have the Bluetooth interface.

Alternatively, the wireless communication means 10 comprise an ANT+ interface.

The mobile telephone 14, hereinafter also referred to as telephone 14, is a telephone equipped with a display unit 15.

The telephone 14 is also set up to establish an Internet connection I1 to a public land mobile network, or PLMN, to connect up to the remote server 12 and transfer in real time to the remote server 12 through the Internet connection I1, data received from the portable medium 3 and relating to the movement of the user 2.

The data relating to the movement of the user 2 comprise, in combination or alternatively, data relating to the signal of the sensor 4 and/or data derived from the signal of the sensor 4, such as, for example, the values of the dimensionless parameter derived by the processor 11.

The remote server 12 is programmed for transmitting motivational indications to the mobile telephone 14 through the Internet connection I1 and in real time, as a function of the data received from the portable medium 3.

The motivational indications are transmitted by the remote server 12 to the mobile telephone 14 and are displayed in real time on the display unit 15 of the selfsame mobile telephone 14.

The motivational indications may comprise recommendations, hints and/or other messages encouraging the user 2 to increase the amount of physical activity performed.

The motivational indications are derived in real time, that is to say, they are derived from the data transmitted by the portable medium 3 to the remote server 12 through the short-range connection C1 established by the wireless communication means 10 and the Internet connection I1.

The display unit 15 of the mobile telephone 14 is preferably a display configured to allow even particularly complex motivational indications (images, animated graphical elements, etc.). In this regard, it should be considered that most mobile telephones 14 currently available on the market possess a sophisticated, high-resolution LCD display.

In light of this, the display unit 15 of the mobile telephone 14 advantageously provides the user 2 with motivational indications which may be highly complex but without necessitating for the medium 3 a display unit 6 that is particularly complex and with a high graphical resolution.

Thus, the display unit 6 of the portable medium 3 may be a simple one, thereby reducing the cost of the medium 3.

Further, according to another aspect, the indication relating to the dimensionless parameter derived by the processor 11 of the medium 3 may also appear on the display unit 25 of the gym machine 9. This advantageously allows the user 2 to view the value of the dimensionless parameter conveniently while he or she is performing an exercise on the gym machine 9.

Advantageously, according to this aspect of the invention, the user 2 is provided with motivational indications in real time while he or she is actually performing the physical activity. The indications are thus particularly effective in encouraging the user 2 to increase the level of physical activity.

One advantage of this invention is thus that it provides a monitoring system 1 and a portable medium 3 which can provide the user 2 with very effective motivational indications.

The above description defines a method for monitoring the physical activity of a user 2 and comprising the steps of:
a) preparing a portable medium 3 designed to be worn by the user 2 and to detect a signal relating to the movement of the user 2;
b) preparing a mobile telephone 14 configured to establish a connection I1 to the Internet;
c) deriving from the movement signal detected by the portable medium 3 a value of a dimensionless parameter representing the physical activity of the user 2 wearing the portable medium 3;
d) setting a reference value of the dimensionless parameter constituting a preset target for the amount of physical activity to be performed by the user 2 in a predetermined time interval;
e) displaying, in real time on the portable medium 3, an indication as a function of the derived value of the dimensionless parameter and of the reference value of the dimensionless parameter;
f) transmitting data relating to the movement of the user 2 in real time to the mobile telephone 14 which is in communication through the Internet connection I1 with a remote server 12 in order to transfer the data to the remote server 12;
g) deriving in real time in the remote server 12 a motivational indication as a function of the data received from the portable medium 3;
h) transmitting the motivational indication in real time to the mobile telephone 14 through the Internet connection I1 established between the mobile telephone 14 and the remote server 12 and displaying the motivational indication on a display unit 15 of the mobile telephone 14.

Preferably, according to another aspect of the invention, the method further comprises the following steps:
i) connecting up to the remote server 12 in order to identify a record relating to the user 2 and to access the historical data relating to the user 2 stored in the remote server 12 and detected by the portable medium 3;
l) entering personal information in the remote server 12;
m) downloading from the remote server 12 to the portable medium 3 a packet of instructions generated according to the historical information and personal information entered, to be used by the processor 11 to calculate the reference value of the dimensionless parameter.

Alternatively to steps i), l) and m), the method might comprise the following steps:
connecting up to the remote server 12 in order to identify a record relating to the user 2 and to access the historical data relating to the user 2 stored in the remote server 12 and detected by the portable medium 3;
selecting a criterion for calculating the reference value of the dimensionless parameter from a list of predetermined types of calculation criteria;
downloading from the remote server 12 to the portable medium 3 a packet of instructions generated according to the selected calculation criterion, to be used by the processor 11 of the portable medium 3 to calculate the reference value of the dimensionless parameter.

According to another aspect of the invention, during the physical activity performed on a gym machine 9, there is a further step of transmitting in real time to the portable medium 3 a signal representing the physical activity performed by the user on the gym machine 9 and the value of the dimensionless parameter is derived in real time also from this detected signal representing the physical activity performed by the user on the gym machine 9 and is displayed in real time on the display unit 15 of the mobile telephone 14 and/or on the display unit 25 of the gym machine 9 and/or on the display unit 6 of the portable medium 3.

Preferably, displayed in real time on the mobile telephone 14 are indications relating to the physical activity performed by the user on the gym machine 9, or further processes applied to the signal.

Preferably, data relating to the signal transmitted by the gym machine to the portable medium 3 are also transmitted to the remote server 12.

One advantage of the method described above is that it allows the monitoring of the physical activity of the user 2 to be accompanied by particularly effective motivational indications.

The monitoring system 1 according to the invention as described and the portable medium 3 can be used for monitoring any type of physical activity, that is to say, it can be used or free body physical activities such as walking, jogging, etc. as well as for physical activities performed on gym machines.

With regard to the system 1, attention is also drawn to the following.

The portable medium 3 preferably comprises means 26 for activating the wireless communication means 10.

The sensor 4 is preferably a three-dimensional accelerometer.

Based on the second aspect of the invention, illustrated in the monitoring system 1 of FIG. 4, the wireless communication means 10 comprise a modem 18 set up to establish a connection 12 to a public land mobile network, or PLMN, when the portable medium 3 is plugged in to the computer 16, that is to say, when the connector 17 is electrically connected to the PC 16 in order to allow data to be transferred from the medium 3 to the PC 16 and vice versa.

The term "public land mobile network", or PLMN, means a network, usually controlled by an operator, providing a land telecommunication service available to the public.

An example of a PLMN network is the GSM network, in which different operators coexist.

The modem 18 is set up to cooperate with the connector 17 for establishing a connection 12 to a PLMN network when the portable medium 3 is plugged in to the computer 16, to allow data to be transferred between the portable medium 3 and/or the computer 16 and the remote server 12 through the PLMN network.

The modem 18 is a wireless modem.

Preferably, but not exclusively, the modem 18 is a UMTS or GPRS modem.

The modem 18 makes it possible to establish a connection 12 between the PC 16 and the remote server 12 through a PLMN network to allow data to be transferred between the portable medium 3 and/or the computer 16 and the remote server 12.

The modem 18 makes it possible to transfer to the remote server 12 not only the data present in the memory 7 of the portable medium but also data relating to processes performed by the PC 16 on the data present in the memory 7 of the portable medium and transferred from the medium 3 to the PC 16.

The PC 16 has an operating system which allows the data to be transferred through the PLMN network and a display unit which allows the data and/or the processes performed on the data to be viewed.

Preferably, the medium 3 also comprises a SIM card (not illustrated), able to be inserted into a slot in the medium 3.

The SIM Card contains information for identifying the medium 3.

In other words, the SIM card allows the PLMN network to identify the medium 3 when the modem 18 connects up to the PLMN network.

Thus, the SIM card allows the PLMN network to identify the medium 3.

In effect, the SIM card is designed to securely store a unique code for identifying the subscriber to the PLMN network and allowing the PLMN operator to associate the medium 3 in which the SIM card is inserted with the profile of a specific user of its mobile telecommunication services.

The SIM card preferably also stores one copy of the personal security key needed to authenticate the user 2 when the modem 18 connects up to the PLMN. The other copy of the key is stored in the information system of the PLMN operator.

In light of this, the SIM card allows the medium 3 to be authenticated.

The medium 3 is configured, preferably but not necessarily, in such a way that when the connector 17 is plugged in to the PC 16 the previously mentioned electronic devices of the medium 3 (processor 11, display unit 6, wireless communication means 10, etc.) are powered by the PC 16 itself with electrical energy transferred through the connector 17.

In light of this, the modem 18 is preferably powered by the PC 16.

According to the second aspect, the remote server 12 is preferably configured to transmit data to the computer 16 through the connection 12 established by the modem 18, as a function of the data received from the modem 18, for displaying on the computer 16.

Besides monitoring the amount of physical activity done, the medium 3 having the technical features relating to the second aspect of the invention can also be used to connect a PC 16 to the Internet. Thus, the medium 3 can be used to connect a PC 16 to the Internet quickly and easily also for purposes other than data transfer to the remote server 12. For example, it allows the PC 16 to access Internet sites for personal/recreational purposes or any other reasons for which the PC 16 must be connected to the Internet.

Thus, the medium 3 comprising the above described features and relating to the second aspect advantageously makes it possible to monitor the physical activity of the user 2 and to establish an Internet connection of any PC 16 to which the user 2 connects the medium 3.

The above description of the medium 3 comprising the technical features of the second aspect of the invention defines a method for monitoring the physical activity of a user 2.

The method comprises the steps of:

preparing a portable medium 3 designed to be worn by the user 2 during the performance of the physical activity and to detect a signal relating to the movement of the user 2;

deriving from the movement signal detected by the portable medium 3 a value of a dimensionless parameter representing the physical activity of the user 2 wearing the portable medium 3;

setting a reference value of the dimensionless parameter constituting a preset target for the amount of physical activity to be performed by the user 2 in a predetermined time interval;

displaying, in real time on the portable medium 3, an indication as a function of the derived value of the dimensionless parameter and of the reference value of the dimensionless parameter;

plugging the portable medium 3 in to a computer 16 to allow data to be transferred from the portable medium 3 to the computer 16 and vice versa;

after the plugging in step, establishing a connection 12 to a public land mobile network through a modem 18 provided in the portable medium 3;

transferring detected and/or derived data, relating to the movement performed by the user 2, from the portable medium 3 and/or from the computer 16 to a remote server 12 through the connection 12.

Preferably, the method comprises a further step of displaying, in real time on the portable medium 3, an indication as a function of the derived value of the dimensionless parameter and of the reference value of the dimensionless parameter.

Advantageously, the method proposed allows a user to monitor the amount of his or her physical activity and also allows any PC 16 to be connected to the Internet when the portable medium is plugged in to the PC, so that data can be transferred from the PC 16 to the remote server 12 and vice versa but also for any other reasons for which the PC 16 must be connected to the Internet.

It should be noted that the system 1 described above comprises, in short:

the remote server 12;

the portable medium 3, able to be plugged in to a mobile telephone 14 and/or a computer 16 to establish a connection to the remote server 12.

The portable medium 3 can also be plugged in to a gym machine to exchange data with the latter.

In the foregoing description, therefore, the mobile telephone 14, the computer 16 and the gym machine do not form part of the system.

This invention, however, also has for an object a system comprising, in addition to the remote server 12 and the portable medium 3, also the mobile telephone 14 and/or the computer 16 (and, if necessary, a gym machine or a plurality of gym machines interconnected in a network).

It should also be noted that the computer 16 might also be built into the gym machine 9.

With regard to the system 1 (in the second aspect of the invention) attention is also drawn to the following.

The portable medium 3 preferably comprises a SIM card to allow the public land mobile network to identify the device.

The remote server 12 is preferably programmed to transmit, in real time through the connection 12, motivational indications as a function of the data transmitted by the portable medium 3 to the remote server 12, so that the motivational indications are displayed on a screen of the computer 16.

The sensor 4 is preferably a three-dimensional accelerometer.

Preferably, the portable medium 3 comprises means 26 for activating the wireless communication means 10.

Preferably, the portable medium 3 comprises a SIM card to allow the public land mobile network to identify the device.

With regard to the method (in the second aspect of the invention) attention is drawn to the following.

The method preferably further comprises the following steps:

identifying a record relating to the user 2 in the remote server 12 and accessing the historical data relating to the user 2 stored in the remote server 12 and detected by the portable medium 3;

entering personal information in the remote server 12;

downloading from the remote server 12 to the portable medium 3 a packet of instructions generated according to the historical information and personal information entered, to be used by the processor 11 to calculate the reference value of the dimensionless parameter.

The method preferably further comprises the following steps:

selecting a criterion for calculating the reference value of the dimensionless parameter from a list of predetermined types of calculation criteria in the remote server 12;

downloading from the remote server 12 to the portable medium 3 a packet of instructions generated according to the selected calculation criterion, to be used by the processor 11 of the portable medium 3 to calculate the reference value of the dimensionless parameter.

Preferably, while performing a physical activity on a gym machine 9, there is a step of transmitting in real time to the portable medium 3 a signal representing the physical activity performed by the user on the gym machine 9, the value of the dimensionless parameter being derived in real time also from the detected signal representing the physical activity performed by the user on the gym machine 9.

The invention described above is susceptible of industrial application and may be modified and adapted in several ways without thereby departing from the scope of the inventive concept. Moreover, all the details of the invention may be substituted by technically equivalent elements.

The invention claimed is:

1. A system (1) for monitoring physical activity of a user (2), comprising:
    a portable medium (3) which can be worn by the user (2) and which is equipped with:
        a sensor (4) designed to detect a signal relating to movement of the user (2);
        a power supply (5);
        a display unit (6) of the portable medium;
        a data storage memory (7);
        an interface (8) which can be coupled to a gym machine (9) and which is configured to allow data to be exchanged between the memory (7) and the gym machine (9);
        a processor (11) programmed for deriving in real time, at least from the signal detected by the sensor (4), a dimensionless parameter value representing the physical activity of the user (2) wearing the portable medium (3) and for displaying, on the display unit (6), an indication, as a function of the derived value of the dimensionless parameter and of a reference value of the dimensionless parameter constituting a preset target for an amount of physical activity to be performed by the user (2) in a predetermined time interval;
    a remote server (12) having access to a database (13) containing data received from the portable medium (3),
    characterized in that the portable medium (3) comprises wireless communication means (10) configured to establish a short-range connection (C1) between the portable medium (3) and a mobile telephone (14), the mobile telephone (14) being equipped with a display unit (15) and being set up to establish an Internet connection (I1) and to connect up to the remote server (12) through the Internet connection (I1) in order to transfer data in real time to the remote server (12) through the Internet connection (I1),
    the remote server (12) being programmed to transmit, in real time through the Internet connection (I1), motivational indications as a function of the data transmitted by the portable medium (3) to the remote server (12), so that the motivational indications are displayed on the display unit (15) of the mobile telephone (14),
    wherein motivational indications are derived in real time from the data transmitted by the portable medium (3) to the remote server (12) through the short-range connection (C1) and the Internet connection (I1), wherein said data comprise said dimensionless parameter, representative of the amount of physical activity carried out by the user during a day, and said reference value of the dimensionless parameter.

2. The system according to claim 1, wherein the remote server (12) is set up to allow selection of a criterion for calculating the reference value of the dimensionless parameter and to download into the memory (7) of the portable medium (3), through the Internet connection (I1) and the short-range connection (C1) established by the wireless communications means (10), instructions for calculating the reference value of the dimensionless parameter, said instructions relating to the selected calculation criterion so that the processor (11) of the portable medium (3) can use those instructions.

3. The system according to claim 1, wherein the interface (8) is configured to receive in real time from the gym machine (9) at least one signal representing the physical activity performed by the user on the gym machine (9) and wherein the processor (11) is programmed to derive the dimensionless parameter also from the signal received from the gym machine (9) and to make the indication available in real time as a function of the derived value of the dimensionless parameter, on the display unit (6) of the portable medium or on a display screen (25) of the gym machine (9) or on the display unit (15) of the mobile telephone (14).

4. A portable medium (3) which can be worn by a user (2) and which is equipped with:
- a sensor (4) designed to detect a signal relating to movement of the user (2);
- a power supply (5);
- a display unit (6);
- a data storage memory (7);
- an interface (8) which can be coupled to a gym machine (9) and which is configured to allow data to be exchanged between the memory (7) and the gym machine (9);
- a processor (11) programmed to derive in real time, at least from the signal detected by the sensor (4), a dimensionless parameter value representing physical activity of the user (2) wearing the portable medium (3) and for displaying, on the display unit (6) of the portable medium, an indication, as a function of the derived value of the dimensionless parameter and of a reference value of that parameter constituting a preset target for an amount of physical activity to be performed by the user (2) in a predetermined time interval,
- characterized in that it comprises wireless communication means (10) configured to establish a short-range connection (C1) between the portable medium (3) and a mobile telephone (14) set up to establish an Internet connection (I1) and to connect up to the remote server (12) through the Internet connection (I1) in order to transfer data relating to the movement of the user (2) in real time to the remote server (12) through the Internet connection (I1),
- to allow motivational indications to be derived in real time from the data transmitted by the portable medium (3) to the remote server (12) through the short-range connection (C1) and the Internet connection (I1), wherein said data comprise said dimensionless parameter, representative of the amount of physical activity carried out by the user during a day, and said reference value of the dimensionless parameter.

5. The portable medium according to claim 4, wherein the portable medium (3) is set up to receive from the remote server (12) calculating instructions used by the processor (11) to calculate the reference value of the dimensionless parameter and to store the instructions in the memory (7).

6. The portable medium according to claim 4, wherein the communication interface (8) is configured to receive in real time from the gym machine (9) a signal representing the physical activity performed by the user on the gym machine (9) and wherein the processor (11) is set up to derive the dimensionless parameter also from the signal received from the gym machine (9) in order to make the indication available on the display unit (6) of the portable medium (3) or on a display screen (25) of the gym machine (9) or on a display unit (15) of the mobile telephone (14).

\* \* \* \* \*